United States Patent
Tanaka et al.

(10) Patent No.: US 7,481,953 B2
(45) Date of Patent: *Jan. 27, 2009

(54) THICK-FILM RESISTOR PASTE AND THICK-FILM RESISTOR

(75) Inventors: Hirobumi Tanaka, Chuo-ku (JP); Katsuhiko Igarashi, Chuo-ku (JP)

(73) Assignee: TDK Corporation, Tokyo (JP)

( * ) Notice: Subject to any disclaimer, the term of this patent is extended or adjusted under 35 U.S.C. 154(b) by 575 days.

This patent is subject to a terminal disclaimer.

(21) Appl. No.: 11/213,800

(22) Filed: Aug. 30, 2005

(65) Prior Publication Data

US 2006/0043345 A1 Mar. 2, 2006

(30) Foreign Application Priority Data

Sep. 1, 2004 (JP) ............................. 2004-254199
Mar. 10, 2005 (JP) ............................. 2005-067192

(51) Int. Cl.
*H01B 1/22* (2006.01)

(52) U.S. Cl. ..................................... 252/514; 338/22 R

(58) Field of Classification Search ................. 252/512, 252/513, 514, 520.2; 338/22 R
See application file for complete search history.

(56) References Cited

U.S. PATENT DOCUMENTS

| 5,277,844 | A | 1/1994 | Rainey |
| 5,491,118 | A | 2/1996 | Hormadaly |
| 6,037,045 | A | 3/2000 | Fukaya |
| 6,399,230 | B1 * | 6/2002 | Tormey et al. ............... 428/702 |
| 6,406,646 | B1 | 6/2002 | Lee et al. |

FOREIGN PATENT DOCUMENTS

| EP | 0 718 855 A2 | 6/1996 |
| JP | 62-119277 | * 11/1985 |
| JP | A 55-130101 | 10/1990 |
| JP | A 2003-197405 | 7/2003 |
| WO | WO 03/097546 A1 | 11/2003 |

* cited by examiner

*Primary Examiner*—Mark Kopec
(74) *Attorney, Agent, or Firm*—Oliff & Berridge, PLC

(57) ABSTRACT

A thick-film resistor paste comprised of a resistor composition dispersed in an organic vehicle, the resistor composition containing at least one of $RuO_2$ and a Ru composite oxide as a conductive material, a glass composition, a titanate compound of an alkali earth metal of any of $BaTiO_3$, $CaTiO_3$, and $SrTiO_3$, a metal material, and further optionally CuO and $Cu_2O$ as an additive, the formulation of the resistor composition optimized in accordance with the required resistance value, enabling realization of a thick-film resistor free of Pb and superior in TCR and STOL.

4 Claims, No Drawings

THICK-FILM RESISTOR PASTE AND THICK-FILM RESISTOR

BACKGROUND OF THE INVENTION

1. Field of the Invention

The present invention relates to a thick-film resistor paste suitable for forming a thick-film resistor and a thick-film resistor formed using a thick-film resistor paste.

2. Description of the Related Art

For example, a thick-film resistor paste is generally comprised of a glass composition, a conductive material, and an organic vehicle as main ingredients. The glass composition is included for adjusting the resistance value and having adhesion. This thick-film resistor paste is printed on a substrate, then fired to form a thick-film resistor of a thickness of 5 to 20 µm or so. Further, in this type of thick-film resistor paste (thick-film resistor), normally a lead-ruthenium oxide etc. is used as the conductive material, while a lead oxide (PbO)-based glass etc. is used as the glass composition.

However, in recent years, environmental issues have become hotly debated. For example, in solder material etc., elimination of lead has been sought. Thick-film resistor paste and thick-film resistors are no exception. Therefore, if considering the environment, use of a lead-ruthenium oxide as the conductive material and use of a PbO-based glass as the glass composition have to be avoided.

In view of this situation, lead-free thick-film resistor pastes and thick-film resistors are being researched in various sectors. For example, Japanese Patent Publication (A) No. 2003-197405 describes to introduce into the resistor paste for example $CaTiO_3$ in an amount over 0 vol % and not more than 13 vol % or NiO in an amount over 0 vol % and not more than 12 vol %. Further, it describes that simultaneous addition of CuO, ZnO, MgO, and other additives is more preferable. Further, this publication describes that by doing this, it is possible to provide a lead-free resistor paste suitable for obtaining a resistor with a high resistance value, yet with a small temperature characteristic of the resistance value (TCR) and short time overload characteristic (STOL).

However, the technology described in Japanese Patent Publication (A) No. 2003-197405 does indeed improve the TCR and STOL, but also discloses samples with a TCR within ±100 ppm and with a STOL close to zero. However, sufficient values of both TCR and STOL are obtained with only extremely limited compositions. In the majority of compositions, the STOL is a value of 1% or more even if small.

If compositions giving sufficiently good values of both TCR and STOL are limited in this way, for example, the freedom of other characteristics is also limited and problems are liable to occur in the design of the resistor paste. Therefore, greater improvement is desired.

SUMMARY OF THE INVENTION

The present invention was made in view of the above situation and has as its object the provision of a thick-film resistor paste and thick-film resistor giving reliably small values of the temperature characteristic of the resistance value (TCR) and the short time overload characteristic (STOL) without regard to the formulation.

The inventors engaged in intensive research over a long period of time to achieve the above-mentioned object and as a result discovered that by jointly adding a metal material (for example Ag) and a titanate compound of an alkali earth metal, it is possible to stably obtain small values of both the TCR and STOL and in particular it is possible to make the STOL a value close to zero.

According to a first aspect of the present invention, there is provided a thick-film resistor paste comprised of a resistor composition dispersed in an organic vehicle, wherein the resistor composition contains at least one of $RuO_2$ and an Ru composite oxide as a conductive material and contains a glass composition, a titanate compound of an alkali earth metal, and a metal material.

In the present invention, as the additive, the combination of the metal material and titanate compound of an alkali earth metal is important. By adding this to the thick-film resistor paste, the TCR of the thick-film resistor formed is remarkably flattened to within ±100 ppm. Further, a value of the STOL close to zero (within ±0.1%) is achieved over a wide range of formulations.

According to the present invention, it is possible to obtain a thick-film resistor in which small values of the temperature characteristic of the resistance value (TCR) and the short time overload characteristic (STOL) are reliably obtained regardless of the formulation.

DESCRIPTION OF THE PREFERRED EMBODIMENTS

Below, embodiments of the thick-film resistor paste and thick-film resistor according to the present invention will be explained in detail.

The thick-film resistor paste of the present invention contains a glass composition, conductive material, and additive (metal material and titanate compound of an alkali earth metal). The resistor composition comprised of these ingredients is mixed with an organic vehicle.

Here, the conductive material is dispersed in an insulator constituted by a glass composition and acts to impart conductivity to the structure constituted by the thick-film resistor. As the conductive material, a conductive material containing Ru is used. For example, $RuO_2$ or a Ru composite oxide is used. As the Ru composite oxide, use of at least one of $CaRuO_3$, $SrRuO_3$, $BaRuO_3$, and $Bi_2Ru_2O_7$ is preferable.

The glass composition is not particularly limited in formulation, but in the present invention it is preferable to use a glass composition substantially free of lead for protection of the environment. Note that in the present invention, "substantially free of lead" means not containing any lead above the level of an impurity. The level of an impurity (for example, a content in the glass composition of 0.05 wt % or less) may be contained. Lead is sometimes contained in extremely small amounts as an unavoidable impurity.

The glass composition acts to bind the conductive material and additive in the thick-film resistor to the substrate when made into a thick-film resistor. As the glass composition, it is possible to use one obtained by mixing and glassifying the materials such as the modifier oxide ingredient and former oxide ingredient. In particular, as the main modifier oxide ingredient, a so-called CaO-based glass using an oxide of an alkali earth metal, specifically, at least one oxide selected from CaO, SrO, and BaO, is used.

Turning to the other ingredients in the glass composition, as the former oxide ingredient, $B_2O_3$ and $SiO_2$ may be mentioned.

Further, as the other modifier oxide ingredient other than the main modifier oxide ingredient, any metal oxide may be used. As a specific metal oxide, for example, $ZrO_2$, $Al_2O_3$, ZnO, CuO, NiO, CoO, MnO, $Cr_2O_3$, $V_2O_5$, MgO, $Li_2O$, Na$_2$O, K$_2$O, TiO$_2$, SnO$_2$, Y$_2$O$_3$, Fe$_2$O$_3$, MnO$_2$, Mn$_3$O$_4$, etc. may be mentioned. It is possible to use one or more of these.

The ingredients of the glass composition may be selected in accordance with the resistance value of the thick-film resistor.

The thick-film resistor paste of the present invention has as its major feature the inclusion of the conductive material and glass composition as the basic formulation in the resistor composition and further both a metal material and a titanate compound of an alkali earth metal as additives.

Among these additives, as the metal material, Ag, Pd, or another single metal, Ag—Pd, an alloy of Ag or Pd, or any other conductive metal in a particle form may be used, but in particular if considering combination with the later explained titanate compounds, Ag is most preferable.

As the titanate compound of an alkali earth metal, BaTiO$_3$, CaTiO$_3$, SrTiO$_3$, MgTiO$_3$, etc. may be mentioned. These titanate compounds are preferably selected in accordance with the resistance value. Further, in this case, the composition is also preferably optimized.

Specifically, for a thick-film resistor paste for preparing a thick-film resistor with a resistance value of 10 kΩ/□ to 25 MΩ/□, it is preferable to make the resistor composition a combination of a metal material constituted by Ag and a titanate compound of an alkali earth metal constituted by BaTiO$_3$.

The resistor composition in this case is preferably 25 to 35 wt % of a conductive material, 35 to 60 wt % of a glass composition, 0 to 20 wt % of a BaTiO$_3$ (however, not including 0), and 0 to 15 wt % of a metal material (however, not including 0).

On the other hand, as the resistor compound in a thick-film resistor paste for preparing a thick-film resistor with a resistance value of 1 kΩ/□ to 500 kΩ/□, a combination of a metal material constituted by Ag and a titanate compound of an alkali earth metal constituted by CaTiO$_3$ or SrTiO$_3$ is preferable.

The resistor composition in this case is preferably 15 to 30 wt % of a conductive material, 50 to 65 wt % of a glass composition, 0 to 15 wt % of at least one of CaTiO$_3$ and SrTiO$_3$ (however, not including 0), and 0 to 20 wt % of a metal material (however, not including 0).

Here, for the above-mentioned thick-film resistor pastes for preparing thick-film resistors with a resistance value of 10 kΩ/□ to 25 MΩ/□ and with a resistance value of 1 kΩ/□ to 500 kΩ/□, the glass composition is preferably a CaO-based glass including CaO as a main modifier oxide ingredient and preferably further includes NiO as another modifier oxide ingredient. Specifically, a glass composition including CaO, B$_2$O$_3$, SiO$_2$, and ZrO$_2$, a glass composition including CaO, B$_2$O$_3$, SiO$_2$, ZrO$_2$, and NiO, etc. may be mentioned.

Further, for a thick-film resistor paste for preparing a thick-film resistor with a resistance value of 10 kΩ/□ or less, it is preferable to use a specific glass composition and optimize the formulation of the resistor composition.

The composition in this case is preferably 25 to 50 wt % of a conductive material, 20 to 65 wt % of a glass composition, 0 to 10 wt % of at least one of BaTiO$_3$, CaTiO$_3$, and SrTiO$_3$ (however, not including 0), and 0 to 45 wt % of a metal material (however, not including 0).

For a thick-film resistor paste for preparing a thick-film resistor with a resistance value of 10 kΩ/□ or less, the glass composition is preferably a CaO-based glass composition or SrO-based glass composition including at least one oxide selected from MnO and Ta$_2$O$_5$ as another modifier oxide ingredient. Specifically, a glass composition containing CaO, B$_2$O$_3$, SiO$_2$, and MnO, a glass composition containing CaO, B$_2$O$_3$, SiO$_2$, ZrO$_2$, and Ta$_2$O$_5$, a glass composition containing SrO, B$_2$O$_3$, SiO$_2$, and MnO, a glass composition containing SrO, B$_2$O$_3$, SiO$_2$, ZrO$_2$, and Ta$_2$O$_5$, etc. may be mentioned.

The formulation of the resistor composition is determined considering not only the resistance value, but also the TCR and STOL. By adopting this range, it is possible to reliably realize small values of the TCR and STOL at different resistance values.

The above-mentioned resistor composition is dispersed in an organic vehicle to make it into a thick-film resistor paste. As the organic vehicle for the thick-film resistor paste, any vehicle used for this type of thick-film resistor paste may be used. For example, ethyl cellulose, polyvinyl butyral, methacrylic resin, butyl methacrylate, or another binder resin and terpineol, butyl carbitol, butyl carbitol acetate, acetate, toluene, alcohols, xylene, and other solvents may be used mixed together. At this time, various types of dispersants or active agents, plasticizers, etc. may be suitably jointly used in accordance with the application etc.

Turning to the ratio of blending of the organic vehicle, the ratio (W2/W1) between the weight (W1) of the resistor composition and the weight (W2) of the organic vehicle is preferably 0.25 to 4 (W2:W1=1:0.25 to 1:4). More preferably, the ratio (W2/W1) is 0.5 to 2. If deviating from this ratio, itis liable to become unable to obtain a thick-film resistor paste of a viscosity suitable for forming a thick-film resistor on for example a substrate.

In the thick-film resistor paste of the present invention, by simultaneously adding the metal material and the titanate compound of an alkali earth metal, it is possible to sufficiently improve the TCR and STOL without using another additive, but another additive may also be introduced in accordance with need. As the additive, any metal oxide may be mentioned, but in particular by using CuO, Cu$_2$O, etc. together, the STOL may be further improved. The optimum range of CuO, Cu$_2$O, etc. differ in accordance with the resistance value. For a resistor composition for a thick-film resistor paste for preparing a thick-film resistor with a resistance value of 10 kΩ/□ to 25 MΩ/□, 0 to 4 wt % is preferable. For a resistor composition for a thick-film resistor paste for preparing a thick-film resistor with a resistance value of 1 kΩ/□ to 500 kΩ/□, 0 to 5 wt % is preferable.

Further, even for a thick-film resistor paste for preparing a thick-film resistor with a resistance value of 10 kΩ/□ or less, it is possible to further improve the STOL by jointly using at least oxide selected from CuO and Cu$_2$O as the additive. The optimum content of the at least one oxide selected from CuO and Cu$_2$O in this case is 8 wt % or less.

Further, for a thick-film resistor paste for preparing a thick-film resistor with a resistance value of 10 kΩ/□ or less, in addition to the conductive material, glass composition, titanate compound of an alkali earth metal, and metal material, it is preferable to further introduce at least one oxide selected from NiO, ZnO, MnO$_2$, and Mn$_3$O$_4$ in an amount of 5 wt % or less as an additive. By jointly using, in addition to the basic formulation, an additive comprised of at least one oxide selected from NiO, ZnO, MnO$_2$, and Mn$_3$O$_4$, the TCR characteristic can be further improved.

To form the thick-film resistor, a thick-film resistor paste including the above-mentioned ingredients may for example be printed (coated) on a substrate by screen printing or another technique and fired at a temperature of about 850° C. As the substrate, an Al$_2$O$_3$ substrate or BaTiO$_3$ substrate or other dielectric substrate, a low temperature fired ceramic substrate, an AlN substrate, etc. may be used. As the type of substrate, a single-layer substrate, composite substrate, or multilayer substrate may be used. In the case of a multilayer substrate, the thick-film resistor may be formed on the surface or may be formed inside. In the thick-film resistor formed, the formulation of the resistor composition included in the thick-film resistor paste is maintained substantially intact even after firing.

When forming the thick-film resistor, normally the substrate is formed with a conductor pattern for forming the electrodes. This conductor pattern may for example be formed by printing a conductive paste including an Ag-based good conductive material including Ag or Pt, Pd, etc. Further, the surface of the thick-film resistor formed may be formed with a glass coating or other protective coating (overglaze).

The electronic device using the thick-film resistor of the present invention is not particularly limited, but for example a single layer or multiple layer circuit board, chip resistor or other resistor, isolator device, C—R compound device, module device, etc. may be mentioned. Further, the invention may also be applied to an electrode part of a multilayer chip capacitor or other capacitor or an inductor etc.

EXAMPLES

Below, specific examples of the present invention will be explained based on experimental results.

<Preparation of Glass Composition>

The oxide of the glass material (in the case of Ca, $CaCO_3$, while in the case of Sr, $SrCO_3$) was weighed in a predetermined amount, mixed in a ball mill, then dried. The obtained powder was placed in a platinum crucible and raised in temperature at a rate of 5° C./min to 1300° C., held at that temperature for 1 hour, then poured into water to rapidly cool and glassify it. The obtained glassy substance was pulverized by a ball mill to obtain a glass composition powder. The following six types of glass composition powder were prepared.

Glass composition 1=$CaO:B_2O_3:SiO_2:ZrO_2$=35:35:25:5 (mol %)

Glass composition 2=$CaO:B_2O_3:SiO_2:ZrO_2:NiO$=33:35: 25:5:2 (mol %)

Glass composition 3=$CaO:B_2O_3:SiO_2:MnO$=32:35:23:10 (mol %)

Glass composition 4=$CaO:B_2O_3:SiO_2:ZrO_2:Ta_2O_5$=35: 35:24:5:1 (mol %)

Glass composition 5=$SrO:B_2O_3:SiO_2:MnO$=32:35:23:10 (mol %)

Glass composition 6=$SrO:B_2O_3:SiO_2:ZrO_2:Ta_2O_5$=35: 35:24:5:1 (mol %)<

<Preparation of Organic Vehicle>

Using ethyl cellulose as a binder and terpineol as an organic solvent, an organic vehicle was prepared by heating and stirring the organic solvent and dissolving the binder.

<Preparation of Thick-Film Resistor Paste>

A conductive material, glass composition powder, additive, and the organic vehicle were weighed to give each formulation which was then kneaded by a triple roll mill to obtain a thick-film resistor paste. Note that the ratio of the total weight of the conductive material, glass composition powder, and additive and the weight of the organic vehicle was adjusted to a weight ratio of a range of 1:0.25 to 1:4 to prepare each resistor paste so that the obtained resistor paste had a viscosity suitable for screen printing.

<Preparation of Resistor>

A 96% purity alumina substrate was screen printed with an Ag—Pt conductor paste to a predetermined shape and then dried. The ratio of the Ag in the Ag–Pt conductor paste was 95 wt %, and the ratio of the Pt was 5 wt %. This alumina substrate was placed in a belt oven and fired by a one-hour pattern from insertion to discharge. The firing temperature at this time was 850° C., and the holding time at this temperature was 10 minutes.

The alumina substrate formed with the conductor in this way was coated with the previously prepared thick-film resistor paste by screen printing to a predetermined shape (1 mm×1 mm rectangle) of a pattern. After this, the thick-film resistor paste was fired under the same conditions as the firing of the conductor to obtain the thick-film resistor.

<Evaluation of Characteristics of Resistor>

(1) Resistance Value

Measured by a Product No. 34401A made by Agilent Technologies. Average value of 24 samples found.

(2) TCR

Rate of change in resistance value when changing the temperature from room temperature of 25° C. to −55° C. and 125° C. found. Average value of tens of samples. If designating the resistance values at −55° C., 25° C., and 125° C. as R−55, R25, and R125 ($\Omega/\square$), TCR (ppm/$\square$)=[(R−55−R25)/R25/80]×1000000 or TCR (ppm/$\square$)=[(R125−R25)/R25/100]×1000000. The larger of the two values is made the TCR value.

(3) STOL (Short Time Overload)

Rate of change in resistance value before and after applying test voltage to thick-film resistor for 5 seconds found. Average value of tens of samples. The test voltage was 2.5× rated voltage, and the rated voltage was $\sqrt{(R/4)}$, where R is the resistance value ($\Omega/\square$). For resistors with resistance values with calculated test voltages over 400V, the test voltage was made 400V.

<Sample 1 to Sample 29>

When preparing each thick-film resistor paste, use was made of the glass composition powder 1 and an additive selected from $BaTiO_3$, Ag, and CuO. Each resistor was prepared in accordance with the description in the section on preparation of a resistor. Note that in Sample 21, CuO was replaced with the use of $Cu_2O$.

<Sample 30 to Sample 36>

When preparing each thick-film resistor paste, use was made of the glass composition powder 2 and an additive selected from $BaTiO_3$, Ag, and CuO. Each resistor was prepared in accordance with the description in the section on preparation of a resistor. Note that in Sample 32, CuO was replaced with the use of $Cu_2O$.

The formulations of the resistor compositions in the samples and the results of evaluation of the characteristics are shown in Table 1. Note that the numerical values in the table show the percentages of the ingredients (wt %). In each of Sample 10 to Sample 36 with suitably set formulations of the resistor composition, a resistance value of over 10 k$\Omega/\square$ was obtained and a TCR of within ±100 ppm and a STOL of within ±0.1% were realized. As opposed to this, in each of Sample 5 to Sample 9 with amounts of addition of $BaTiO_3$, Ag, and CuO outside the suitable ranges, the STOL became a large value of over −1%. Further, even in Sample 1 to Sample 4 with unsuitable ratios of the conductive material and glass composition, deterioration of the TCR and STOL was seen.

TABLE 1

| Sample no. | Cond. Material Type | Form. | Glass comp. Type | Form. | BaTiO3 | Ag | CuO | R | TCR | STOL(ΔR) |
|---|---|---|---|---|---|---|---|---|---|---|
| 1 | CaRuO3 | *20 | 1 | 57 | 15 | 5 | 3 | 8.5M | ±467 | −0.02% |
| 2 | CaRuO3 | *40 | 1 | 40 | 15 | 5 | 3 | 13.3k | ±903 | −0.05% |
| 3 | CaRuO3 | 35 | 1 | *34 | 15 | 12 | 4 | 390k | ±98 | −5.60% |
| 4 | CaRuO3 | 25 | 1 | *65 | 5 | 1 | 4 | 10.1M | ±348 | −6.89% |
| 5 | CaRuO3 | 30 | 1 | 59 | *0 | 5 | 3 | 9.5k | ±45 | −3.98% |
| 6 | CaRuO3 | 30 | 1 | 40 | *23 | 5 | 2 | 2.5M | ±251 | −1.56% |
| 7 | CaRuO3 | 30 | 1 | 52 | 15 | *0 | 3 | 167k | ±447 | −3.60% |
| 8 | CaRuO3 | 30 | 1 | 40 | 15 | *20 | *5 | 483k | ±50 | −5.78% |
| 9 | CaRuO3 | 30 | 1 | 45 | 15 | 5 | 3 | 67k | ±78 | −8.90% |
| 10 | CaRuO3 | 25 | 1 | 52 | 15 | 5 | 3 | 9.6M | ±89 | −0.08% |
| 11 | CaRuO3 | 35 | 1 | 42 | 15 | 5 | 3 | 870k | ±76 | −0.05% |
| 12 | CaRuO3 | 33 | 1 | 40 | 15 | 9 | 3 | 1.1M | ±56 | −0.02% |
| 13 | CaRuO3 | 25 | 1 | 60 | 7 | 5 | 3 | 9.3M | ±94 | −0.04% |
| 14 | CaRuO3 | 35 | 1 | 55 | 5 | 12 | 3 | 5.6M | ±84 | −0.03% |
| 15 | CaRuO3 | 25 | 1 | 42 | 20 | 10 | 3 | 6.3M | ±56 | −0.05% |
| 16 | CaRuO3 | 35 | 1 | 46 | 15 | 1 | 3 | 8.4M | ±67 | −0.06% |
| 17 | CaRuO3 | 25 | 1 | 42 | 15 | 15 | 3 | 3.4M | ±80 | −0.03% |
| 18 | CaRuO3 | 35 | 1 | 44 | 15 | 5 | 1 | 1.5M | ±60 | −0.02% |
| 19 | CaRuO3 | 25 | 1 | 51 | 15 | 5 | 4 | 5.5M | ±86 | −0.03% |
| 20 | CaRuO3 | 35 | 1 | 55 | 15 | 5 | 0 | 7.4M | ±98 | −0.01% |
| 21 | CaRuO3 | 25 | 1 | 52 | 15 | 5 | 3(Cu2O) | 9.3M | ±80 | −0.09% |
| 22 | RuO2 | 25 | 1 | 52 | 15 | 5 | 3 | 10.5k | ±86 | −0.06% |
| 23 | RuO2 | 35 | 1 | 44 | 15 | 5 | 1 | 11.4k | ±82 | −0.05% |
| 24 | SrRuO3 | 25 | 1 | 52 | 15 | 5 | 3 | 9.8M | ±90 | −0.06% |
| 25 | SrRuO3 | 35 | 1 | 44 | 15 | 5 | 1 | 1.3M | ±70 | −0.04% |
| 26 | BaRuO3 | 25 | 1 | 52 | 15 | 5 | 3 | 11.2M | ±85 | −0.02% |
| 27 | BaRuO3 | 35 | 1 | 44 | 15 | 5 | 1 | 3.9M | ±88 | −0.02% |
| 28 | Bi2Ru2O7 | 25 | 1 | 52 | 15 | 5 | 3 | 19.3M | ±50 | −0.06% |
| 29 | Bi2Ru2O7 | 35 | 1 | 44 | 15 | 5 | 1 | 6.5M | ±80 | −0.05% |
| 30 | CaRuO3 | 35 | 2 | 55 | 15 | 5 | 0 | 5.2M | ±46 | −0.01% |
| 31 | CaRuO3 | 35 | 2 | 42 | 15 | 5 | 3 | 505k | ±22 | −0.01% |
| 32 | CaRuO3 | 25 | 2 | 52 | 15 | 5 | 3(Cu2O) | 8.6M | ±90 | −0.05% |
| 33 | RuO2 | 35 | 2 | 55 | 15 | 5 | 0 | 19.3k | ±85 | −0.09% |
| 34 | SrRuO3 | 35 | 2 | 55 | 15 | 5 | 0 | 11.9M | ±95 | −0.05% |
| 35 | BaRuO3 | 35 | 2 | 55 | 15 | 5 | 0 | 15.6M | ±90 | −0.03% |
| 36 | Bi2Ru2O7 | 35 | 2 | 55 | 15 | 5 | 0 | 20.2M | ±83 | −0.04% |

<Sample 37 to Sample 56>
When preparing each thick-film resistor paste, use was made of the glass composition powder 1 and an additive selected from CaTiO3, Ag, and CuO. Each resistor was prepared in accordance with the description in the section on preparation of a resistor.

<Sample 57 to Sample 58>
When preparing each thick-film resistor paste, use was made of the glass composition powder 2 and an additive selected from CaTiO3, Ag, and CuO. Each resistor was prepared in accordance with the description in the section on preparation of a resistor.

<Sample 59 to Sample 60>
When preparing each thick-film resistor paste, use was made of the glass composition powder 2 and an additive selected from SrTiO3, Ag, and CuO. Each resistor was prepared in accordance with the description in the section on preparation of a resistor.

The formulations of the resistor compositions in the samples and the results of evaluation of the characteristics are shown in Table 2. Note that the numerical values in the table show the percentages of the ingredients (wt %). In each of Sample 46 to Sample 60 with suitably set formulations of the resistor composition, a resistance value in the range of 1 kΩ/□ to 500 kΩ/□ was obtained and a TCR of within ±100 ppm and a STOL of within ±0.1% were realized. As opposed to this, in each of Sample 41 to Sample 45 with amounts of addition of CaTiO3, SrTiO3, Ag, and CuO outside the suitable ranges, the TCR became over ±100 ppm and the STOL became a larger value of over −1%. Further, even in Sample 37 to Sample 40 with unsuitable ratios of the conductive material and glass composition, deterioration of the TCR and STOL was seen.

TABLE 2

| Sample no. | Cond. Material Type | Form. | Glass comp. Type | Form. | CaTiO3 | SrTiO3 | Ag | CuO | R | TCR | STOL(ΔR) |
|---|---|---|---|---|---|---|---|---|---|---|---|
| 37 | CaRuO3 | *10 | 1 | 65 | 15 | 0 | 5 | 5 | 508k | ±389 | −0.03% |
| 38 | CaRuO3 | *35 | 1 | 50 | 5 | 0 | 5 | 5 | 4k | ±705 | −3.98% |
| 39 | CaRuO3 | 30 | 1 | *45 | 15 | 0 | 5 | 5 | 5k | ±290 | −3.83% |
| 40 | CaRuO3 | 15 | 1 | *70 | 5 | 0 | 5 | 5 | 580k | ±588 | −1.38% |
| 41 | CaRuO3 | 30 | 1 | 60 | *0 | 0 | 5 | 5 | 34k | ±280 | −6.91% |

TABLE 2-continued

| Sample no. | Cond. Material Type | Form. | Glass comp. Type | Form. | CaTiO$_3$ | SrTiO$_3$ | Ag | CuO | R | TCR | STOL(ΔR) |
|---|---|---|---|---|---|---|---|---|---|---|---|
| 42 | CaRuO$_3$ | 20 | 1 | 50 | *20 | 0 | 5 | 5 | 490k | ±509 | −0.04% |
| 43 | CaRuO$_3$ | 30 | 1 | 50 | 15 | 0 | *0 | 5 | 205k | ±653 | −0.05% |
| 44 | CaRuO$_3$ | 15 | 1 | 50 | 5 | 0 | *25 | 5 | 17k | ±235 | −8.99% |
| 45 | CaRuO$_3$ | 20 | 1 | 50 | 15 | 0 | 5 | *10 | 2k | ±109 | −20.08% |
| 46 | CaRuO$_3$ | 15 | 1 | 60 | 15 | 0 | 5 | 5 | 451k | ±89 | −0.08% |
| 47 | CaRuO$_3$ | 30 | 1 | 55 | 5 | 0 | 5 | 5 | 22k | ±76 | −0.05% |
| 48 | CaRuO$_3$ | 30 | 1 | 50 | 15 | 0 | 5 | 5 | 34k | ±55 | −0.03% |
| 49 | CaRuO$_3$ | 15 | 1 | 65 | 10 | 0 | 5 | 5 | 280k | ±76 | −0.02% |
| 50 | CaRuO$_3$ | 29 | 1 | 60 | 1 | 0 | 5 | 5 | 13k | ±94 | −0.04% |
| 51 | CaRuO$_3$ | 29 | 1 | 50 | 15 | 0 | 1 | 5 | 53k | ±65 | −0.07% |
| 52 | CaRuO$_3$ | 25 | 1 | 54 | 15 | 0 | 1 | 5 | 338k | ±77 | −0.06% |
| 53 | CaRuO$_3$ | 15 | 1 | 50 | 10 | 0 | 20 | 5 | 4k | ±80 | −0.05% |
| 54 | CaRuO$_3$ | 25 | 1 | 55 | 15 | 0 | 5 | 0 | 88k | ±58 | −0.05% |
| 55 | CaRuO$_3$ | 29 | 1 | 60 | 5 | 0 | 5 | 1 | 5k | ±55 | −0.03% |
| 56 | CaRuO$_3$ | 25 | 1 | 53 | 12 | 0 | 5 | 5 | 43k | ±40 | −0.04% |
| 57 | CaRuO$_3$ | 15 | 2 | 60 | 15 | 0 | 5 | 5 | 109k | ±40 | −0.01% |
| 58 | CaRuO$_3$ | 29 | 2 | 60 | 1 | 0 | 5 | 5 | 5k | ±53 | −0.01% |
| 59 | CaRuO$_3$ | 15 | 2 | 60 | 0 | 15 | 5 | 5 | 110k | ±55 | −0.03% |
| 60 | CaRuO$_3$ | 29 | 2 | 60 | 0 | 1 | 5 | 5 | 7k | ±60 | −0.02% |

<Sample 61 to Sample 118>

In each of sample 61 to sample 118, use was made of a glass composition powder constituted by MnO-containing glass (glass composition powder 3 or glass composition powder 5) and an additive selected from BaTiO$_3$, CaTiO$_3$, SrTiO$_3$, Ag, CuO, etc. Each resistor was prepared in accordance with the description in the section on preparation of a resistor. Note that in Sample 80, CuO was replaced with the use of Cu$_2$O.

The formulations of the resistor compositions in the samples and the results of evaluation of the characteristics are shown in Table 3 and Table 4. Note that the numerical values in the tables show the percentages of the ingredients (wt %). Table 3 shows the results of evaluation of resistors using BaTiO$_3$ as the titanate compound of an alkali earth metal, while Table 4 shows the results of evaluation of resistors using CaTiO$_3$ or SrTiO$_3$ as the titanate compound of an alkali earth metal.

As clear from Table 3, in each of Sample 70 to Sample 92 using BaTiO$_3$ as the titanate compound of an alkali earth metal, the formulation of the resistor composition is suitable set. With this, a resistance value of 10 kΩ/□ or less is obtained and a TCR of within ±100 ppm and a STOL of within ±0.1% are realized. As opposed to this, in each of Sample 65 to Sample 69 with amounts of addition of BaTiO$_3$, Ag, and CuO outside the suitable ranges, the TCR became over ±100 ppm and the STOL became a large value over 1%. Further, even in Sample 61 to Sample 64 with unsuitable ratios of the conductive material and glass composition, deterioration of the TCR and STOL was seen.

Further, as clear from Table 4, even when using CaTiO$_3$ or SrTiO$_3$ as the titanate compound of an alkali earth metal, results similar to those of BaTiO$_3$ were exhibited.

TABLE 3

| Sample no. | Cond. Material Type | Form. | Glass comp. Type | Form. | BaTiO$_3$ | Ag | CuO | Other additives Type | Form. | R | TCR | STOL(ΔR) |
|---|---|---|---|---|---|---|---|---|---|---|---|---|
| 61 | RuO$_2$ | *55 | 3 | 25.6 | 0.2 | 18 | 1.2 | — | 0 | 3 | ±1097 | 2.20% |
| 62 | RuO$_2$ | *20 | 3 | 38.6 | 0.2 | 40 | 1.2 | — | 0 | 47 | ±860 | 2.90% |
| 63 | RuO$_2$ | 25 | 3 | *70.6 | 0.2 | 3 | 1.2 | — | 0 | 207 | ±801 | 3.70% |
| 64 | RuO$_2$ | 40 | 3 | *15.6 | 0.2 | 43 | 1.2 | — | 0 | 18 | ±367 | 1.80% |
| 65 | RuO$_2$ | 30 | 3 | 40.8 | *15 | 13 | 1.2 | — | 0 | 168 | ±590 | 2.60% |
| 66 | RuO$_2$ | 35 | 3 | 28.8 | *0 | 35 | 1.2 | — | 0 | 10 | ±106 | 3.90% |
| 67 | RuO$_2$ | 25 | 3 | 23.6 | 0.2 | *50 | 1.2 | — | 0 | 6 | ±911 | 2.40% |
| 68 | RuO$_2$ | 40 | 3 | 58.6 | 0.2 | *0 | 1.2 | — | 0 | 93 | ±765 | 1.30% |
| 69 | RuO$_2$ | 30 | 3 | 29.8 | 0.2 | 30 | *10 | — | 0 | 2 | ±1324 | 0% |
| 70 | RuO$_2$ | 35 | 3 | 31.6 | 0.2 | 32 | 1.2 | — | 0 | 9 | ±56 | 0% |
| 71 | RuO$_2$ | 25 | 3 | 23.8 | 5 | 45 | 1.2 | — | 0 | 33 | ±86 | 0% |
| 72 | RuO$_2$ | 45 | 3 | 23.8 | 5 | 25 | 1.2 | — | 0 | 5 | ±94 | 0% |
| 73 | RuO$_2$ | 50 | 3 | 28.6 | 0.2 | 20 | 1.2 | — | 0 | 4 | ±90 | 0% |
| 74 | RuO$_2$ | 45 | 3 | 20 | 0.2 | 33.6 | 1.2 | — | 0 | 8 | ±86 | 0% |
| 75 | RuO$_2$ | 30 | 3 | 65 | 0.2 | 3.6 | 1.2 | — | 0 | 27 | ±80 | 0% |
| 76 | RuO$_2$ | 40 | 3 | 38.8 | 10 | 10 | 1.2 | — | 0 | 34 | ±91 | 0% |
| 77 | RuO$_2$ | 40 | 3 | 31.8 | 0.2 | 20 | 8 | — | 0 | 9 | ±84 | 0% |
| 78 | CaRuO$_3$ | 38 | 3 | 53 | 6 | 1.5 | 1.5 | — | 0 | 111 | ±76 | 0% |
| 79 | SrRuO$_3$ | 38 | 3 | 53 | 6 | 1.5 | 1.5 | — | 0 | 105 | ±66 | 0% |
| 80 | RuO$_2$ | 35 | 3 | 31.6 | 0.2 | 32 | 1.2(Cu$_2$O) | — | 0 | 8 | ±62 | 0% |
| 81 | RuO$_2$ | 35 | 3 | 29.6 | 0.2 | 32 | 1.2 | NiO | 2 | 13 | ±75 | 0% |
| 82 | RuO$_2$ | 35 | 3 | 29.6 | 0.2 | 32 | 1.2 | Zno | 2 | 7 | ±85 | 0% |
| 83 | RuO$_2$ | 35 | 3 | 29.6 | 0.2 | 32 | 1.2 | Mn$_3$O$_4$ | 2 | 5 | ±89 | 0% |

TABLE 3-continued

| Sample no. | Cond. Material Type | Form. | Glass comp. Type | Form. | BaTiO₃ | Ag | CuO | Other additives Type | Form. | R | TCR | STOL(ΔR) |
|---|---|---|---|---|---|---|---|---|---|---|---|---|
| 84 | RuO₂ | 35 | 3 | 27.6 | 0.2 | 32 | 1.2 | NiO<br>ZnO | 2<br>2 | 15 | ±80 | 0% |
| 85 | RuO₂ | 35 | 3 | 27.6 | 0.2 | 32 | 1.2 | NiO<br>MnO₂ | 2<br>2 | 21 | ±75 | 0% |
| 86 | RuO₂ | 35 | 3 | 27.6 | 0.2 | 32 | 1.2 | ZnO<br>MnO₂ | 2<br>2 | 34 | ±88 | 0% |
| 87 | BaRuO₃ | 35 | 3 | 29.6 | 0.2 | 32 | 1.2 | Mn₃O₄ | 2 | 2006 | ±58 | 0% |
| 88 | Bi₂Ru₂O₇ | 35 | 3 | 29.6 | 0.2 | 32 | 1.2 | NiO | 2 | 3500 | ±70 | 0% |
| 89 | RuO₂ | 35 | 5 | 31.6 | 0.2 | 32 | 1.2 | — | 0 | 13 | ±74 | 0% |
| 90 | SrRuO₃ | 35 | 5 | 31.6 | 0.2 | 32 | 1.2 | — | 0 | 1098 | ±74 | 0% |
| 91 | BaRuO₃ | 35 | 5 | 31.6 | 0.2 | 32 | 1.2 | — | 0 | 2155 | ±80 | 0% |
| 92 | Bi₂Ru₂O₇ | 35 | 5 | 31.6 | 0.2 | 32 | 1.2 | — | 0 | 3920 | ±90 | 0% |

TABLE 4

| Sample no. | Cond. Material Type | Form. | Glass comp. Type | Form. | CaTiO₃ | SrTiO₃ | Ag | CuO | R | TCR | STOL(ΔR) |
|---|---|---|---|---|---|---|---|---|---|---|---|
| 93 | CaRuO₃ | *55 | 3 | 25.6 | 0 | 0.2 | 18 | 1.2 | 1034 | ±1109 | 1.80% |
| 94 | CaRuO₃ | *20 | 3 | 38.6 | 0 | 0.2 | 40 | 1.2 | 578 | ±934 | 2.20% |
| 95 | CaRuO₃ | 25 | 3 | *70.6 | 0 | 0.2 | 3 | 1.2 | 55 | ±765 | 1.90% |
| 96 | CaRuO₃ | 40 | 3 | *15.6 | 0 | 0.2 | 43 | 1.2 | 774 | ±559 | 1.30% |
| 97 | CaRuO₃ | 30 | 3 | 40.8 | 0 | *15 | 13 | 1.2 | 2730 | ±1230 | 2.10% |
| 98 | CaRuO₃ | 35 | 3 | 28.8 | 0 | *0 | 35 | 1.2 | 408 | ±760 | 2.00% |
| 99 | CaRuO₃ | 25 | 3 | 23.6 | 0 | 0.2 | *50 | 1.2 | 410 | ±570 | 1.50% |
| 100 | CaRuO₃ | 40 | 3 | 58.6 | 0 | 0.2 | *0 | 1.2 | 289 | ±348 | 1.40% |
| 101 | CaRuO₃ | 30 | 3 | 24.8 | 0 | 0.2 | 30 | *15 | 500 | ±890 | 1.90% |
| 102 | CaRuO₃ | 25 | 3 | 43.8 | 0 | 0.2 | 30 | 1.2 | 289 | ±98 | 0% |
| 103 | CaRuO₃ | 50 | 3 | 38.6 | 0 | 0.2 | 10 | 1.2 | 824 | ±87 | 0% |
| 104 | CaRuO₃ | 40 | 3 | 20 | 0 | 0.2 | 38.6 | 1.2 | 170 | ±85 | 0% |
| 105 | CaRuO₃ | 25 | 3 | 65 | 0 | 0.2 | 8.6 | 1.2 | 450 | ±93 | 0% |
| 106 | CaRuO₃ | 40 | 3 | 23.8 | 0 | 10 | 25 | 1.2 | 167 | ±95 | 0% |
| 107 | CaRuO₃ | 30 | 3 | 23.6 | 0 | 0.2 | 45 | 1.2 | 431 | ±64 | 0% |
| 108 | CaRuO₃ | 40 | 3 | 58.5 | 0 | 0.2 | 0.1 | 1.2 | 553 | ±88 | 0% |
| 109 | CaRuO₃ | 30 | 3 | 41 | 0 | 1 | 20 | 8 | 354 | ±73 | 0% |
| 110 | RuO₂ | 35 | 3 | 31.6 | 0 | 0.2 | 32 | 1.2 | 10 | ±65 | 0% |
| 111 | RuO₂ | 35 | 3 | 33.6 | 0.2 | 0 | 30 | 1.2 | 16 | ±50 | 0% |
| 112 | RuO₂ | 35 | 5 | 31.6 | 0 | 0.2 | 32 | 1.2 | 13 | ±76 | 0% |
| 113 | RuO₂ | 35 | 5 | 31.6 | 0.2 | 0 | 32 | 1.2 | 7 | ±89 | 0.02% |
| 114 | SrRuO₃ | 35 | 5 | 31.6 | 0 | 0.2 | 32 | 1.2 | 1220 | ±66 | 0% |
| 115 | BaRuO₃ | 35 | 5 | 31.6 | 0 | 0.2 | 32 | 1.2 | 3820 | ±88 | 0% |
| 116 | BaRuO₃ | 35 | 5 | 31.6 | 0.2 | 0 | 32 | 1.2 | 3545 | ±76 | 0% |
| 117 | Bi₂Ru₂O₇ | 35 | 5 | 31.6 | 0 | 0.2 | 32 | 1.2 | 5908 | ±80 | 0% |
| 118 | Bi₂Ru₂O₇ | 35 | 5 | 31.6 | 0 | 0.2 | 32 | 1.2 | 5536 | ±76 | 0% |

<Sample 119 to Sample 178>

In each of Sample 119 to Sample 178, use was made of a glass composition powder constituted by a Ta₂O₅-containing glass (glass composition powder 4 or glass composition powder 6) and an additive selected from BaTiO₃, CaTiO₃, SrTiO₃, Ag, CuO, etc. Each resistor was prepared in accordance with the description in the section on preparation of a resistor. Note that in Sample 138, CuO is replaced with use of Cu₂O.

The formulations of the resistor compositions in the samples and the results of evaluation of the characteristics are shown in Table 5 and Table 6. Note that the numerical values in the tables show the percentages of the ingredients (wt %). Table 5 shows the results of evaluation of resistors using BaTiO₃ as the titanate compound of an alkali earth metal, while Table 6 shows the results of evaluation of resistors using CaTiO₃ or SrTiO₃ as the titanate compound of an alkali earth metal.

As clear from Table 5, in each of Sample 128 to Sample 150 with suitably set formulations of the resistor composition, a resistance value of 10 kΩ/□ or less was obtained and good values of both TCR and STOL were also obtained. As opposed to this, in each of Sample 123 to Sample 127 with amounts of addition of BaTiO₃, Ag, and CuO outside the suitable ranges, the TCR and the STOL became large values. Further, even in Sample 119 to Sample 122 with unsuitable ratios of the conductive material and glass composition, deterioration of the TCR and STOL was seen.

Further, as clear from Table 6, even when using as CaTiO₃ or SrTiO₃ as the titanate compound of an alkali earth metal, results similar to those of BaTiO₃ were exhibited.

As explained above, even when using a Ta₂O₅-containing glass (glass composition powder 4 or 6), results similar to the case of an MnO-containing glass (glass composition powder 3 or 5) were obtained.

TABLE 5

| Sample no. | Cond. Material Type | Form. | Glass comp. Type | Form. | BaTiO₃ | Ag | CuO | Other additives Type | Form. | R | TCR | STOL(ΔR) |
|---|---|---|---|---|---|---|---|---|---|---|---|---|
| 119 | RuO₂ | *55 | 4 | 25.6 | 0.2 | 18 | 1.2 | — | 0 | 10 | ±785 | 1.20% |
| 120 | RuO₂ | *20 | 4 | 38.6 | 0.2 | 40 | 1.2 | — | 0 | 49 | ±680 | 2.60% |
| 121 | RuO₂ | 25 | 4 | *70.6 | 0.2 | 3 | 1.2 | — | 0 | 498 | ±573 | 1.80% |
| 122 | RuO₂ | 40 | 4 | *15.6 | 0.2 | 43 | 1.2 | — | 0 | 34 | ±200 | 2.00% |
| 123 | RuO₂ | 30 | 4 | 40.8 | *15 | 13 | 1.2 | — | 0 | 287 | ±491 | 1.30% |
| 124 | RuO₂ | 35 | 4 | 28.8 | *0 | 35 | 1.2 | — | 0 | 10 | ±230 | 2.40% |
| 125 | RuO₂ | 25 | 4 | 23.6 | 0.2 | *50 | 1.2 | — | 0 | 17 | ±1075 | 2.30% |
| 126 | RuO₂ | 40 | 4 | 58.6 | 0.2 | *0 | 1.2 | — | 0 | 114 | ±450 | 1.00% |
| 127 | RuO₂ | 30 | 4 | 29.8 | 0.2 | 30 | *10 | — | 0 | 5 | ±987 | 2.00% |
| 128 | RuO₂ | 35 | 4 | 31.6 | 0.2 | 32 | 1.2 | — | 0 | 34 | ±76 | 0% |
| 129 | RuO₂ | 25 | 4 | 23.8 | 5 | 45 | 1.2 | — | 0 | 67 | ±56 | 0% |
| 130 | RuO₂ | 45 | 4 | 23.8 | 5 | 25 | 1.2 | — | 0 | 18 | ±89 | 0% |
| 131 | RuO₂ | 50 | 4 | 37 | 1 | 10 | 2 | — | 0 | 9 | ±43 | 0% |
| 132 | RuO₂ | 45 | 4 | 20 | 3 | 31 | 1 | — | 0 | 11 | ±96 | 0% |
| 133 | RuO₂ | 25 | 4 | 65 | 5 | 2 | 3 | — | 0 | 77 | ±100 | 0% |
| 134 | RuO₂ | 30 | 4 | 39 | 10 | 20 | 1 | — | 0 | 154 | ±87 | 0% |
| 135 | RuO₂ | 30 | 4 | 40 | 2 | 20 | 8 | — | 0 | 8 | ±90 | 0% |
| 136 | CaRuO₃ | 38 | 4 | 53 | 6 | 1.5 | 1.5 | — | 0 | 432 | ±50 | 0% |
| 137 | SrRuO₃ | 38 | 4 | 53 | 6 | 1.5 | 1.5 | — | 0 | 515 | ±69 | 0% |
| 138 | RuO₂ | 35 | 4 | 31.6 | 0.2 | 32 | 1.2(Cu₂O) | — | 0 | 24 | ±88 | 0% |
| 139 | RuO₂ | 35 | 4 | 29.6 | 0.2 | 32 | 1.2 | NiO | 2 | 42 | ±103 | 0% |
| 140 | RuO₂ | 35 | 4 | 29.6 | 0.2 | 32 | 1.2 | ZnO | 2 | 32 | ±111 | 0% |
| 141 | RuO₂ | 35 | 4 | 29.6 | 0.2 | 32 | 1.2 | Mn₃O₄ | 2 | 21 | ±80 | 0% |
| 142 | RuO₂ | 35 | 4 | 27.6 | 0.2 | 32 | 1.2 | NiO ZnO | 2 2 | 48 32 | ±45 | 0% |
| 143 | RuO₂ | 35 | 4 | 27.6 | 0.2 | 32 | 1.2 | NiO MnO₂ | 2 2 | 19 33 | ±50 | 0% |
| 144 | RuO₂ | 35 | 4 | 27.6 | 0.2 | 32 | 1.2 | ZnO MnO₂ | 2 2 | 76 80 | ±52 | 0% |
| 145 | RuO₂ | 35 | 6 | 31.6 | 0.2 | 32 | 1.2 | — | 0 | 11 | ±60 | 0% |
| 146 | SrRuO₃ | 35 | 6 | 31.6 | 0.2 | 32 | 1.2 | — | 0 | 389 | ±70 | 0% |
| 147 | BaRuO₃ | 35 | 6 | 31.6 | 0.2 | 32 | 1.2 | — | 0 | 593 | ±75 | 0% |
| 148 | BaRuO₃ | 35 | 6 | 29.6 | 0.2 | 32 | 1.2 | ZnO | 2 | 418 | ±70 | 0% |
| 149 | Bi₂Ru₂O₇ | 35 | 6 | 31.6 | 0.2 | 32 | 1.2 | — | 0 | 743 | ±81 | 0% |
| 150 | Bi₂Ru₂O₇ | 35 | 6 | 29.6 | 0.2 | 32 | 1.2 | MnO₂ | 2 | 587 | ±59 | 0% |

TABLE 6

| Sample no. | Cond. Material Type | Form. | Glass comp. Type | Form. | CaTiO₃ | SrTiO₃ | Ag | CuO | R | TCR | STOL(ΔR) |
|---|---|---|---|---|---|---|---|---|---|---|---|
| 151 | CaRuO₃ | *55 | 4 | 25.6 | 0 | 0.2 | 18 | 1.2 | 3876 | ±887 | 1.50% |
| 152 | CaRuO₃ | *20 | 4 | 38.6 | 0 | 0.2 | 40 | 1.2 | 1875 | ±1232 | 1.80% |
| 153 | CaRuO₃ | 25 | 4 | *70.6 | 0 | 0.2 | 3 | 1.2 | 439 | ±759 | 2.50% |
| 154 | CaRuO₃ | 40 | 4 | *15.6 | 0 | 0.2 | 43 | 1.2 | 1090 | ±465 | 2.20% |
| 155 | CaRuO₃ | 30 | 4 | 40.8 | 0 | *15 | 13 | 1.2 | 5356 | ±870 | 1.30% |
| 156 | CaRuO₃ | 35 | 4 | 28.8 | 0 | *0 | 35 | 1.2 | 459 | ±1009 | 2.00% |
| 157 | CaRuO₃ | 25 | 4 | 23.6 | 0 | 0.2 | *50 | 1.2 | 879 | ±760 | 1.90% |
| 158 | CaRuO₃ | 40 | 4 | 58.6 | 0 | 0.2 | *0 | 1.2 | 400 | ±487 | 2.40% |
| 159 | CaRuO₃ | 30 | 4 | 24.8 | 0 | 0.2 | 30 | *15 | 703 | ±530 | 2.90% |
| 160 | CaRuO₃ | 25 | 4 | 43.8 | 0 | 0.2 | 30 | 1.2 | 590 | ±109 | 0% |
| 161 | CaRuO₃ | 50 | 4 | 38.6 | 0 | 0.2 | 10 | 1.2 | 1320 | ±66 | 0% |
| 162 | CaRuO₃ | 50 | 4 | 20 | 0 | 10 | 15 | 5 | 4670 | ±100 | 0% |
| 163 | CaRuO₃ | 21 | 4 | 65 | 0 | 7 | 5 | 2 | 7144 | ±98 | 0% |
| 164 | CaRuO₃ | 30 | 4 | 50 | 0 | 10 | 5 | 5 | 4007 | ±106 | 0% |
| 165 | CaRuO₃ | 37 | 4 | 45 | 0 | 3 | 10 | 8 | 1022 | ±74 | 0% |
| 166 | CaRuO₃ | 30 | 4 | 23.6 | 0 | 0.2 | 45 | 1.2 | 558 | ±116 | 0% |
| 167 | CaRuO₃ | 40 | 4 | 58.5 | 0 | 0.2 | 0.1 | 1.2 | 804 | ±109 | 0% |
| 168 | CaRuO₃ | 38 | 4 | 53 | 0 | 6 | 1.5 | 1.5 | 333 | ±80 | 0% |
| 169 | SrRuO₃ | 38 | 4 | 53 | 0 | 6 | 1.5 | 1.5 | 419 | ±75 | 0% |
| 170 | RuO₂ | 35 | 4 | 31.6 | 0 | 0.2 | 32 | 1.2 | 110 | ±88 | 0% |
| 171 | RuO₂ | 35 | 4 | 31.6 | 0.2 | 0 | 32 | 1.2 | 56 | ±76 | 0.04% |
| 172 | RuO₂ | 35 | 6 | 31.6 | 0 | 0.2 | 32 | 1.2 | 13 | ±72 | 0% |
| 173 | RuO₂ | 35 | 6 | 31.6 | 0.2 | 0 | 32 | 1.2 | 10 | ±90 | 0% |
| 174 | SrRuO₃ | 35 | 6 | 31.6 | 0 | 0.2 | 32 | 1.2 | 401 | ±56 | 0% |
| 175 | BaRuO₃ | 35 | 6 | 31.6 | 0 | 0.2 | 32 | 1.2 | 611 | ±76 | 0% |
| 176 | BaRuO₃ | 35 | 6 | 31.6 | 0.2 | 0 | 32 | 1.2 | 598 | ±55 | 0% |
| 177 | Bi₂Ru₂O₇ | 35 | 6 | 31.6 | 0 | 0.2 | 32 | 1.2 | 843 | ±50 | 0% |
| 178 | Bi₂Ru₂O₇ | 35 | 6 | 31.6 | 0.2 | 0 | 32 | 1.2 | 913 | ±76 | 0% |

While the invention has been described with reference to specific embodiments chosen for purpose of illustration, it should be apparent that numerous modifications could be made thereto by those skilled in the art without departing from the basic concept and scope of the invention.

The invention claimed is:

1. A thick-film resistor paste including a resistor composition dispersed in an organic vehicle, wherein said resistor composition contains as a conductive material at least one selected from the group consisting of $RuO_2$, $CaRuO_3$, $SrRuO_3$, $BaRuO_3$, and $Bi_2Ru_2O_7$ and contains a CaO-based glass composition, $BaTiO_3$, and Ag as a metal material;

wherein said resistor composition includes 25 to 35 wt % of the conductive material, 35 to 60 wt % of the CaO-based glass composition, greater than 0 to 20 wt % of $BaTiO_3$, and greater than 0 to 15 wt % of the metal material.

2. The thick-film resistor paste as set forth in claim 1, containing as an additive at least one additive selected from the group consisting of CuO and $Cu_2O$ in an amount of 4 wt % or less.

3. The thick-film resistor paste as set forth in claim 1, wherein said glass composition contains NiO.

4. A thick-film resistor formed using a thick-film resistor paste including a resistor composition dispersed in an organic vehicle, wherein said resistor composition contains as a conductive material at least one selected from the group consisting of $RuO_2$, $CaRuO_3$, $SrRuO_3$, $BaRuO_3$, and $Bi_2Ru_2O_7$ and contains a CaO-based glass composition, and Ag as a metal material wherein said resistor composition includes 25 to 35 wt % of the conductive material, 35 to 60 wt % of the CaO-based glass composition, greater than 0 to 20 wt % of $BaTiO_3$, and greater than 0 to 15 wt % of a metal material and having a resistance value of 10 k$\Omega$/□ to 25 M$\Omega$/□.

* * * * *